US010454919B2

(12) United States Patent
Goldman (10) Patent No.: US 10,454,919 B2
(45) Date of Patent: Oct. 22, 2019

(54) SECURE COMPONENT CERTIFICATE PROVISIONING

(71) Applicant: International Business Machines Corporation, Armonk, NY (US)

(72) Inventor: Kenneth A Goldman, Norwalk, CT (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 92 days.

(21) Appl. No.: 14/191,119

(22) Filed: Feb. 26, 2014

(65) Prior Publication Data

US 2015/0244709 A1  Aug. 27, 2015

(51) Int. Cl.
*H04L 29/06* (2006.01)
*H04L 9/32* (2006.01)

(52) U.S. Cl.
CPC ........ *H04L 63/0823* (2013.01); *H04L 9/3263* (2013.01)

(58) Field of Classification Search
CPC .......................... G06F 21/6218; H04L 12/2483
See application file for complete search history.

(56) References Cited

U.S. PATENT DOCUMENTS

| 6,035,402 | A | * | 3/2000 | Vaeth | H04L 9/321 713/158 |
| 6,189,097 | B1 | | 2/2001 | Tycksen, Jr. et al. | |
| 7,120,800 | B2 | | 10/2006 | Ginter et al. | |
| 7,853,782 | B1 | * | 12/2010 | Geddes | G06F 21/33 705/78 |
| 8,074,262 | B2 | | 12/2011 | Scarlata | |
| 8,601,566 | B2 | * | 12/2013 | Adusumilli | H04L 63/04 726/12 |
| 2004/0030887 | A1 | * | 2/2004 | Harrisville-Wolff | H04L 63/0442 713/155 |
| 2005/0149723 | A1 | * | 7/2005 | Watkins | H04L 63/0823 713/156 |
| 2006/0256108 | A1 | | 11/2006 | Scaralata | |
| 2007/0079120 | A1 | | 4/2007 | Bade et al. | |
| 2008/0215468 | A1 | * | 9/2008 | Monsa-Chermon | G06Q 10/00 705/34 |
| 2010/0023757 | A1 | * | 1/2010 | Nguyen-Huu | H04L 9/083 713/156 |
| 2010/0161998 | A1 | | 6/2010 | Chen et al. | |
| 2010/0287363 | A1 | * | 11/2010 | Thorsen | G06F 21/575 713/2 |

(Continued)

OTHER PUBLICATIONS

Comodo, "Comodo Code Signing Certificates," 2012.

(Continued)

*Primary Examiner* — Khalil Naghdali
(74) *Attorney, Agent, or Firm* — Tutunjian & Bitetto, P.C.; Vazken Alexanian (57) ABSTRACT

A system and method for secure component provisioning implements a three-way transaction to thwart fraudulent component provisioning when a certificate requester is not fully trusted. A certificate authority receives a certificate request for a component from a contract manufacturer and then issues the certificate, sending the issued certificate to a final assembly point for provisioning of the component.

16 Claims, 4 Drawing Sheets

(56) References Cited

U.S. PATENT DOCUMENTS

| | | | |
|---|---|---|---|
| 2010/0299313 A1* | 11/2010 | Orsini | H04L 9/085 |
| | | | 707/652 |
| 2011/0238260 A1 | 9/2011 | Kotani et al. | |
| 2012/0060027 A1* | 3/2012 | Vilhuber | H04L 63/0442 |
| | | | 713/156 |
| 2012/0272056 A1* | 10/2012 | Ganesan | H04L 63/0838 |
| | | | 713/156 |
| 2013/0046972 A1* | 2/2013 | Campagna | H04L 9/0841 |
| | | | 713/156 |
| 2014/0281503 A1* | 9/2014 | Mills | H04L 9/3263 |
| | | | 713/157 |

OTHER PUBLICATIONS

WIPO, "Patent Cooperation Treaty (PCT) Administrative Instructions Under the Patent Cooperation Treaty, Annex F," Feb. 17, 2010.
Microsoft, "Implementing an Exchange 2003-Based Message Security System in a Test Environment," May 19, 2005.
M. Myers et al., "X.509 Internet Public Key Infrastructure Online Certificate Status Protocol," Jun. 1999.

\* cited by examiner

```
┌─────────────────────────────────────┐
│  Component Manufacturer Generates a Key │
│                                     │
│                 210                 │
└─────────────────────────────────────┘
                  ⇓
┌─────────────────────────────────────┐
│    Certificate Request Issued to CA │
│                                     │
│                 220                 │
└─────────────────────────────────────┘
                  ⇓
┌─────────────────────────────────────┐
│        CA Generates Certificate     │
│                                     │
│                 230                 │
└─────────────────────────────────────┘
                  ⇓
┌─────────────────────────────────────┐
│ CA Sends Certificate to Final Assembly Point │
│                                     │
│                 240                 │
└─────────────────────────────────────┘
                  ⇓
┌─────────────────────────────────────┐
│ Certificate is Matched to Component by Public │
│                 Key                 │
│                 250                 │
└─────────────────────────────────────┘
                  ⇓
┌─────────────────────────────────────┐
│  Certificate is Provisioned onto Component │
│                                     │
│                 260                 │
└─────────────────────────────────────┘
```

SECURE COMPONENT CERTIFICATE PROVISIONING

CROSS-REFERENCE TO RELATED APPLICATIONS

None.

FIELD OF THE INVENTION

The invention disclosed broadly relates to the field of digital certificates, and more particularly relates to the field of digital certificate provisioning of components.

BACKGROUND OF THE INVENTION

Public key cryptography is implemented to exchange information with a basic level of security. Here's how public key works:
  1. A first user generates a key pair, one public, one private.
  2. The first user provides the public key to a second user and retains the private key.
  3. The first user receives a message from the second user; the message is encrypted with the public key
  4. The first user decrypts the message using the private key.

Digital certificates provide an extra level of security when used with keys. A digital certificate is a public key that has been digitally signed by a recognized authority (a Certificate Authority) attesting that the owner of the key is the actual owner. A Certificate Authority signs a user's public key with its own private key. Managing certificates uses the Public Key Infrastructure, or PKI.

Figure 1:
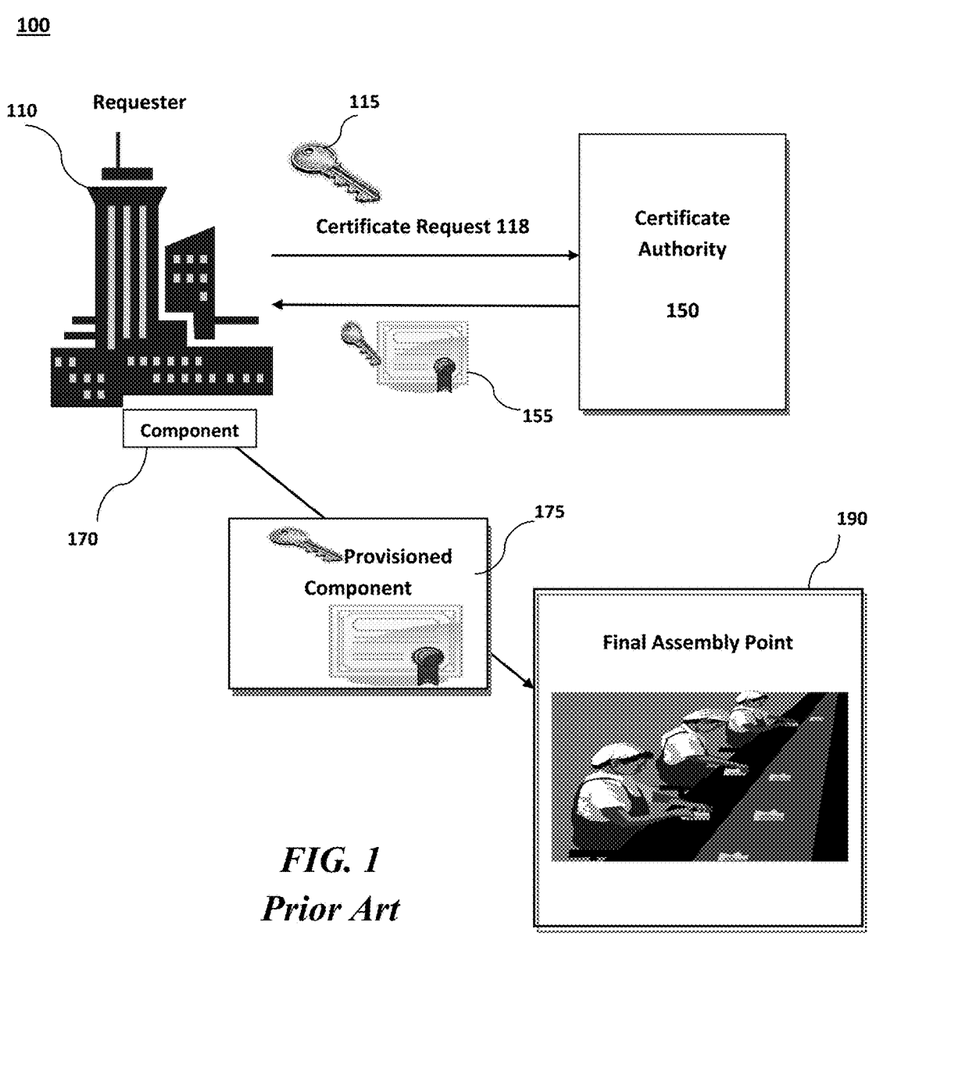
FIG. 1 is a simplified illustration of a digital certificate flow, according to the known art.

Referring now to the drawings in general and to FIG. 1 in particular, a typical component provisioning flow using digital certificates is shown. The process begins when a Requester 110 creates a key pair and sends a certificate request 118, including the public key 115, to a Certificate Authority (CA) 150. Assume the Requester 110, for purposes of this disclosure, is a contract manufacturer who buys directly from a Trusted Platform Module (TPM) component manufacturer to the specifications of a system manufacturer (in this case acting as the CA 150).

The CA 150 decides whether to proceed. If the CA 150 is assured that the request is legitimate, the CA 150 forms and signs a certificate 155 and sends the certificate and the public key 115 back to the Requester 110. The Requester 110 then provisions the component 170 with the key 115 and certificate 155 and sends the provisioned component 175 to the final assembly point 190. Basically, component provisioning in the information technology (IT) environment follows these basic steps:
  1. Generate a key pair;
  2. Associate the key pair with the component;
  3. Generate a certificate with the public key;
  4. Provision the component with the certificate The TPM 175 is an inexpensive crypto device that holds a key pair including a public key 115 that requires a certificate 155 issued by the system manufacturer acting as a (CA) 150. The system manufacturer is concerned that the contract manufacturer (the Requester 110) might ask for additional component certificates 155 and use the extra provisioned components 175 for counterfeit systems. In other words, the contract manufacturer acting as the Requester 110 is an untrusted source. When the Requester 110 is not fully trusted, the CA 150 cannot, with the information provided, definitively decide whether to issue the certificate 155.

This issue is worsened if the Requester 110 acts as the CA 150, because in that case, the Requester 110 can issue certificates 155 without detection. Another problem can occur when the system manufacturer acts as the CA 150. The system manufacturer can determine that extra certificates were issued but cannot undo the process in time to recover the incorrectly provisioned components. One solution might be for the system manufacturer to delay provisioning of the component 170 until final assembly. However, the certificate creation process might be slow and perhaps run over an unreliable link to a secure facility. Any delay would shut down final assembly.

There is a need for a system and method to overcome the above-stated shortcomings of the known art.

SUMMARY OF THE INVENTION

Briefly, according to an embodiment of the disclosure a method for secure component provisioning implements a three-way transaction among a contract manufacturer acting as a Requester, a Certificate Authority, and a Final Assembly Point of a system manufacturer. The method, from the point of view of the Certificate Authority, includes steps or acts of: receiving a certificate request from the Requester, the certificate request including a key associated with a component sent from the Requester to the Final Assembly Point; issuing the certificate; and sending the issued certificate to the Final Assembly Point for provisioning, thereby generating an authenticated provisioned component.

According to an embodiment of the present disclosure, the method for secure component provisioning, from the point of view of the Final Assembly Point, includes steps or acts of: receiving the issued certificate from the Certificate Authority; receiving the component from the certificate Requester; matching the issued certificate with the component; and provisioning the component with the issued certificate when a match occurs.

According to another embodiment of the present disclosure, a system for secure component provisioning includes: a processor device; and a memory operably coupled with the processor device. The memory has computer-executable instructions stored thereon that enable the method steps recited above.

According to another embodiment of the present disclosure, a computer program product includes a computer-readable storage medium with program instructions stored thereon, the program instructions enabling a computer to perform the method steps for secure component provisioning.

BRIEF DESCRIPTION OF THE SEVERAL VIEWS OF THE DRAWINGS

To describe the foregoing and other exemplary purposes, aspects, and advantages, we use the following detailed description of an exemplary embodiment of the disclosure with reference to the drawings, in which.

While the disclosure as claimed can be modified into alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the scope of the present disclosure.

DETAILED DESCRIPTION

Before describing in detail embodiments that are in accordance with the present disclosure, it should be observed that the embodiments reside primarily in combinations of method steps and system components related to systems and methods for placing computation inside a communication network. Accordingly, the system components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

Definitions of Terms.

TPM—a Trusted Platform Module is a secure crypto processor hardware component residing in a system.

SIM card—A Subscriber Identity Module (SIM) is a memory chip used mostly in portable devices such as cell phones. A SIM card holds the personal information of the phone owner. Smart card—a small card resembling a credit card, with a microprocessor inside.

Web Server software such as WebSphere by IBM is software that performs as a web application server.

Provisioning—in IT, provisioning is an integration of "providing" and "configuring." In the case of TPMs, provisioning entails outfitting the TPM so that its security can be confirmed and it is ready to use. Without provisioning, a legitimate TPM can't prove its authenticity. The certificate 155 authenticates the TPM for use in the particular system for which it is provisioned.

We describe a system and method implementing a three-way transaction in the secure provisioning of components 170 to thwart fraudulent provisioning in cases where the Requester 110 is not fully trusted. The disclosure splits the typical two-way provisioning transaction into a three-way transaction such that a contract manufacturer, the Requester 110, even if untrusted, cannot complete the provisioning process to the point where it can counterfeit components 170.

Figure 2:
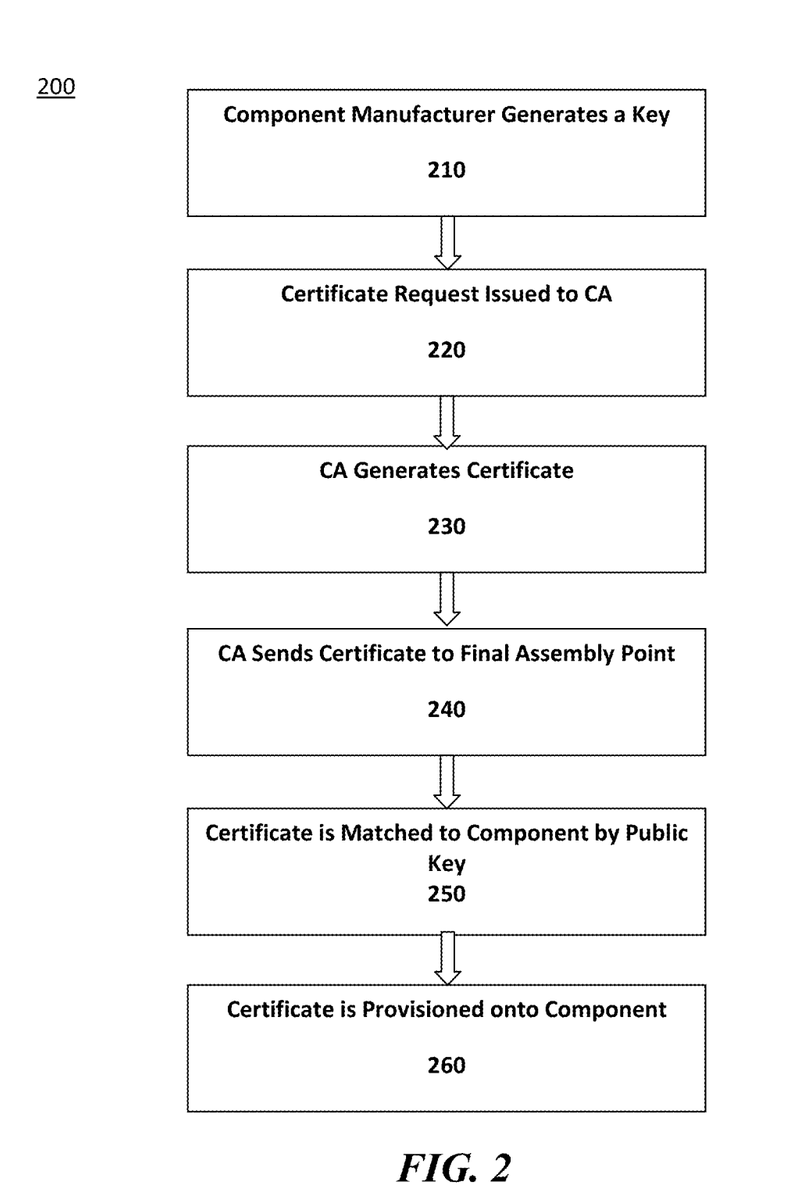
FIG. 2 is a high-level flowchart of a method for certificate provisioning, according to an embodiment of the present disclosure.

Referring now to FIG. 2, we show a flowchart 200 of the process steps for secure component provisioning, according to one embodiment of the present disclosure. First, in step 210, the Requester 110 generates the key pair required for identifying and authenticating a component 170. The components 170 can include software components for installation or download, such as a web server. The components 170 can also include hardware components such as a TPM or a SIM card, machine parts, and assembly parts.

In step 220 the contract manufacturer as the Requester 110 issues a certificate request 118 to the CA 150 (which can be the system manufacturer, or another entity trusted by the system manufacturer). The certificate request includes the public key 115. The CA 150 generates the certificate 155 in step 230. So far this part of the process is identical to that shown in FIG. 1.

We deviate from the known art of component provisioning in the next step wherein the CA 150 does not send the certificate 155 back to the Requester 110, as would be typical. Instead, in step 240, the CA 150 sends the certificate 155 forward to the final assembly point 190, where it is matched to the component 170 provided by the untrusted Requester 110. It is here in the final assembly point 190 that the component 170 is provisioned with the matched certificate 155 in order to generate a provisioned component 175. The final assembly point 190 can be another department within the CA 150, or another company, or it can be a client computer in the case of software provisioning.

In a typical flow, the Requester 110 does its piece of the flow in a batch process, and days, weeks, or even months of certificates 155 might be created in advance at the CA 150. A relatively short delay or outage at the CA 150 simply means that certificate requests 118 are queued. The Requester 110 is not halted in its processing. By the time the non-provisioned components 170 reach the final assembly point 190, there can be a repository of certificates 155 waiting to be matched. The certificates 155 are matched to their respective components 170 in step 250 at the final assembly point 190, e.g., by matching the public key 115. The certificates 155 are provisioned onto the components 170 at this trusted point in step 260, generating trusted, provisioned components 175.

Figure 3:
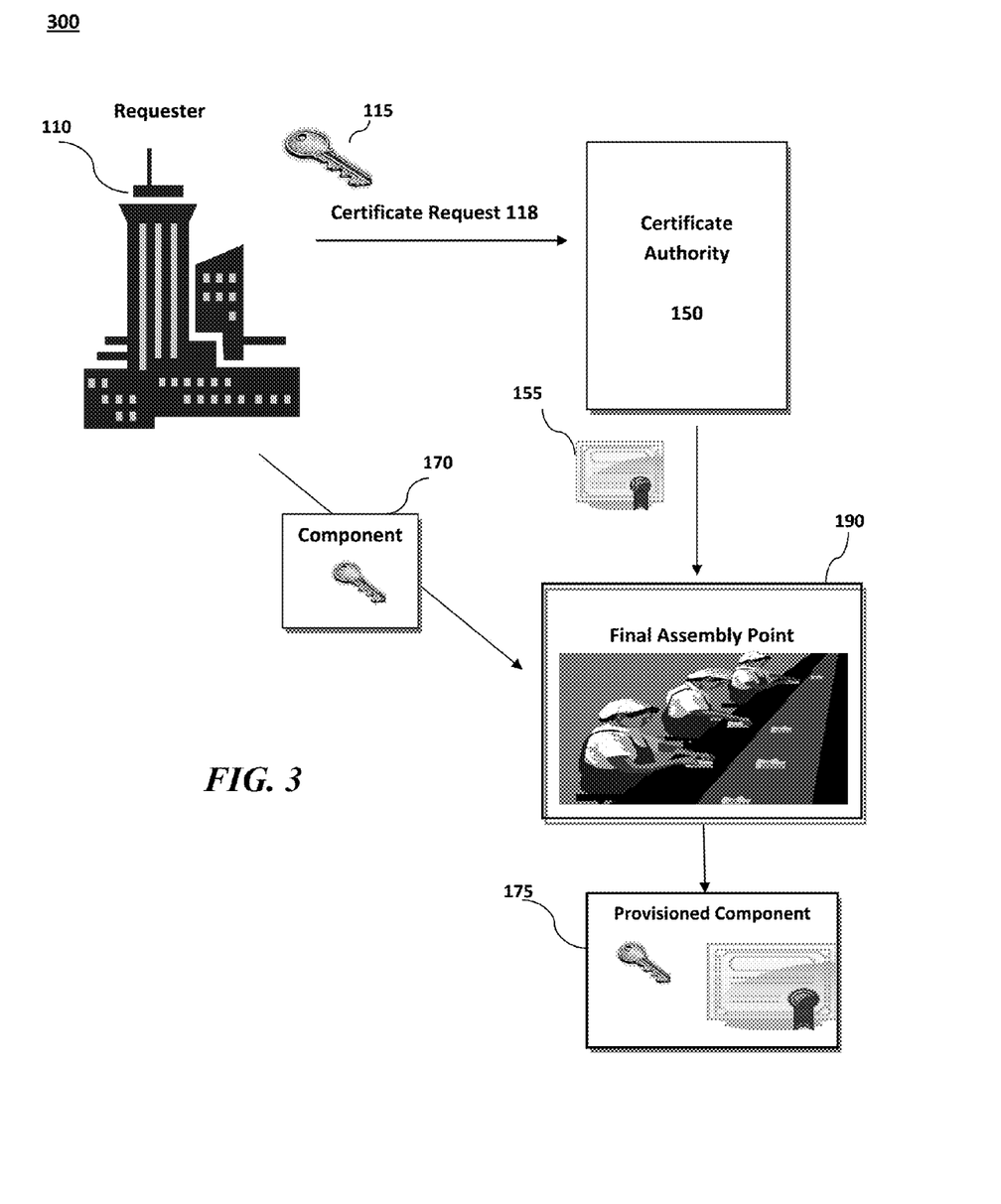
FIG. 3 is a simplified illustration of a digital certificate flow, according to an embodiment of the present disclosure.

It should be noted that the Requester 110 can procure extra components 170, generate keys 115, and send requests to the CA 150. The CA 150, not knowing that the parts are extra, will create the certificates 155. However, since the Requester 110 never receives the certificates 155, it cannot complete the provisioning of the extra components, thus the fraudulent provisioning is thwarted In this novel process flow, the component provisioning occurs at the final assembly point 190, which is a trusted environment. FIG. 3 shows a simplified illustration of the component provisioning flow according to an embodiment of the present disclosure. Though shown separately, the final assembly point 190 can be located within the CA 150.

Hardware Embodiment.

Figure 4:
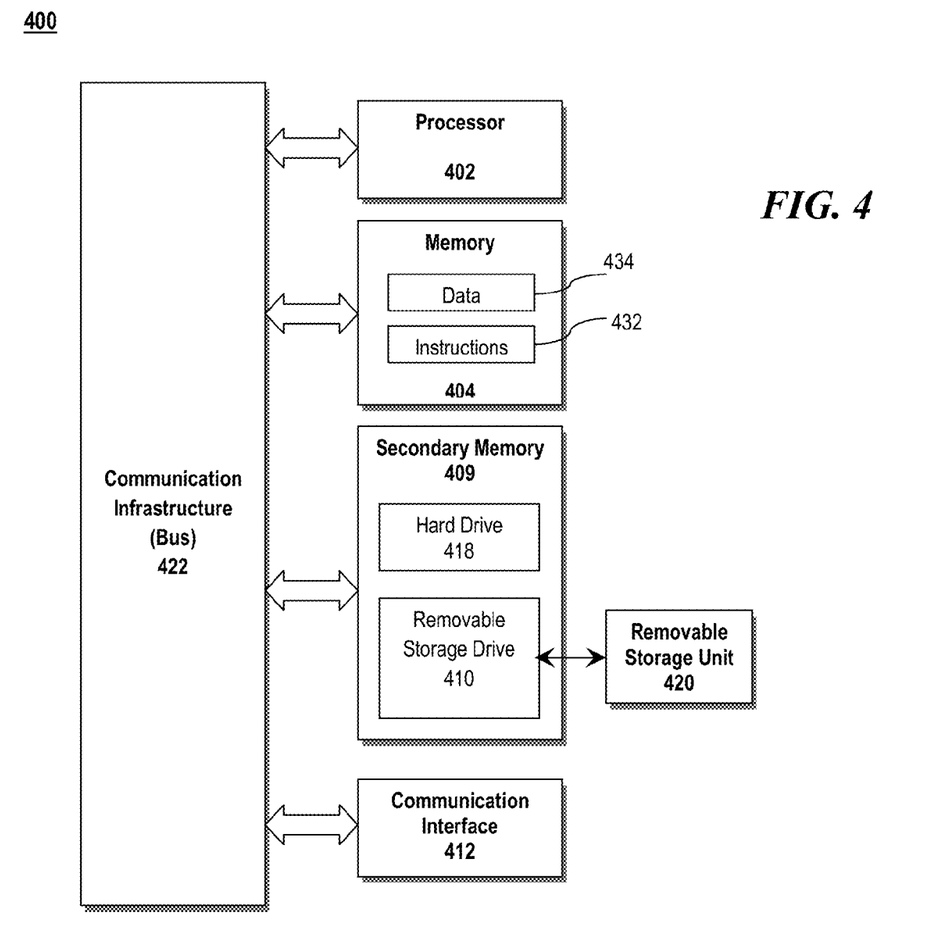
FIG. 4 is a high level block diagram showing an information processing system configured to operate according to an embodiment of the present disclosure.

Referring now to FIG. 4, there is provided a simplified pictorial illustration of an information processing system 400 for secure provisioning of components in which embodiments of the present disclosure may be implemented. For purposes of this disclosure, computer system 400 may represent any type of computer, information processing system or other programmable electronic device, including a client computer, a server computer, a portable computer, an embedded controller, a personal digital assistant, Cloud computing, Internet TV, a TPM chip, a Smart card, a Web Server, and so on. The computer system 400 may be a stand-alone device or networked into a larger system. Computer system 400, illustrated for exemplary purposes as a networked computing device, is in communication with other networked computing devices (not shown) via a network. As will be appreciated by those of ordinary skill in the art, network may be embodied using conventional networking technologies and may include one or more of the following: local area networks, wide area networks, intranets, public Internet and the like.

Throughout the description herein, an embodiment of the invention is illustrated with aspects of the invention embodied solely on computer system 400. As will be appreciated by those of ordinary skill in the art, aspects of the invention may be distributed amongst one or more networked computing devices which interact with computer system 400 via one or more data networks such as, for example, network 410. However, for ease of understanding, aspects of the invention have been embodied in a single computing device—computer system 400.

Computer system 400 includes inter alia, processing device 402 which communicates with an input/output subsystem 406, memory 404, storage 410 and network 410. The processor device 402 is operably coupled with a communication infrastructure 422 (e.g., a communications bus, crossover bar, or network). The processor device 402 may be a general or special purpose microprocessor operating under control of computer program instructions 432 executed from memory 404 on program data 434. The processor 402 may include a number of special purpose sub-processors such as a comparator engine, each sub-processor for executing particular portions of the computer program instructions. Each sub-processor may be a separate circuit able to operate substantially in parallel with the other sub-processors.

Some or all of the sub-processors may be implemented as computer program processes (software) tangibly stored in a memory that perform their respective functions when executed. These may share an instruction processor, such as a general purpose integrated circuit microprocessor, or each sub-processor may have its own processor for executing instructions. Alternatively, some or all of the sub-processors may be implemented in an ASIC. RAM may be embodied in one or more memory chips.

The memory 404 may be partitioned or otherwise mapped to reflect the boundaries of the various memory subcomponents. Memory 404 may include both volatile and persistent memory for the storage of: operational instructions 432 for execution by CPU 402, data registers, application storage and the like. Memory 404 preferably includes a combination of random access memory (RAM), read only memory (ROM) and persistent memory such as that provided by a hard disk drive 418. The computer instructions/applications that are stored in memory 404 are executed by processor 402. The computer instructions/applications 432 and program data 434 can also be stored in hard disk drive 418 for execution by processor device 402. Those skilled in the art will appreciate that the functionality implemented within the blocks illustrated in the diagram may be implemented as separate components or the functionality of several or all of the blocks may be implemented within a single component.

The computer system 400 may also include secondary memory 409 including a removable storage drive 410, representing a floppy disk drive, a magnetic tape drive, an optical disk drive, etc. The removable storage drive 410 reads from and/or writes to a removable storage unit 420 in a manner well known to those having ordinary skill in the art. Removable storage unit 420 represents a floppy disk, a compact disc, magnetic tape, optical disk, CD-ROM, DVD-ROM, and any other removable storage known or contemplated which is read by and written to by removable storage drive 410. As will be appreciated, the removable storage unit 420 includes a non-transitory computer readable medium having stored therein computer software and/or data.

The computer system 400 may also include a communications interface 412. Communications interface 412 allows software and data to be transferred between the computer system and external devices. Examples of communications interface 412 may include a modem, a network interface (such as an Ethernet card), a communications port, a PCM-CIA slot and card, etc. Software and data transferred via communications interface 412 are in the form of signals which may be, for example, electronic, electromagnetic, optical, or other signals capable of being received by communications interface 412.

The present disclosure may be embodied as a system, a method, and/or a computer program product. The computer program product may include a computer readable storage medium (or media) 420 having computer readable program instructions thereon for causing a processor to carry out aspects of the present disclosure.

The computer readable storage medium 420 can be a tangible device that can retain and store instructions for use by an instruction execution device. The computer readable storage medium 420 may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium 420 or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor 402 of a general purpose computer, special purpose computer, or other programmable data processing apparatus to produce a machine, such that the instructions, which execute via the processor 402 of the computer or other programmable data processing apparatus, create means for implementing the functions/acts specified in the flowchart and/or block diagram block or blocks. These computer readable program instructions may also be stored in a computer readable storage medium 420 that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Therefore, while there has been described what are presently considered to be the preferred embodiments, it will understood by those skilled in the art that other modifications can be made within the spirit of the disclosure. The above descriptions of embodiments are not intended to be exhaustive or limiting in scope. The embodiments, as described, were chosen in order to explain the principles of the disclosure, show its practical application, and enable those with ordinary skill in the art to understand how to make and use the disclosure. It should be understood that the disclosure is not limited to the embodiments described above, but rather should be interpreted within the full meaning and scope of the appended claims.

I claim:

1. A method for secure component certificate provisioning, comprising:
   receiving, over an unsecured public network, a certificate request by a first party from a second party using a transmission medium, said certificate request comprising a key associated with a component sent over the unsecured public network by the second party to a third party;
   generating and issuing, by the first party, a certificate corresponding to the key from the certificate request by the second party; and
   preventing fraudulent provisioning by preventing receipt of the certificate by a non-trusted requestor by generating and sending, using a processor, a secure provisioned component over the unsecured public network, the generating and sending the secure provisioned component comprising sending the issued certificate over the unsecured public network from the first party to the third party for provisioning the component with the issued certificate, the secure component certificate provisioning being a one-directional transaction wherein the third party matches the issued certificate to the component for provisioning the component.

2. The method of claim 1 wherein receiving the certificate request comprises receiving a public key of a private/public key pair.

3. The method of claim 1 wherein sending the issued certificate to the third party comprises forwarding the issued certificate to a final assembly point within a same organization as the first party.

4. An information processing system for secure component certificate provisioning comprising:
   a processor device of a first party;
   a memory device operably coupled with the processor device, said memory device having computer-executable instructions stored thereon for:
      receiving, over an unsecured public network, a certificate request by the first party from a second party using a transmission medium, said certificate request comprising a key associated with a component sent over the unsecured public network by the second party to a third party;
      generating and issuing, by the first party, a certificate corresponding to the key from the certificate request by the second party; and
      preventing fraudulent provisioning by preventing receipt of the certificate by a non-trusted requestor by generating and sending, using the processor, a secure provisioned component over the unsecured public network, the generating and sending the secure provisioned component comprising sending the issued certificate over the unsecured public network from the first party to the third party for provisioning the component with the issued certificate, the secure component certificate provisioning being a one-directional transaction wherein the third party matches the issued certificate to the component for provisioning the component.

5. The information processing system of claim 4 wherein the second party is a component manufacturer.

6. The information processing system of claim 4 further comprising a transmission link between the first party and the second party.

7. The information processing system of claim 6 wherein the transmission link is unreliable.

8. The information processing system of claim 4 wherein the second party is an untrusted entity.

9. The information processing system of claim 4 wherein the third party is a final assembly point.

10. The information processing system of claim 9 wherein the final assembly point is part of a same organization as the first party.

11. The information processing system of claim 4 wherein the component comprises an object selected from a group consisting of: a machine part, a hardware component, and a software component.

12. The information processing system of claim 4 wherein the key comprises a public key of a private/public key pair.

13. The information processing system of claim 11 wherein the component is a Web server.

14. The information processing system of claim 11 wherein the component is a Trusted Platform Module.

15. A computer program product for secure component provisioning, the computer program product comprising a non-transitory computer readable storage medium having program instructions embodied therewith, the program instructions executable by a processor device of a first party to cause the processor device to perform:

receiving, over an unsecured public network, a certificate request by the first party from a second party using a transmission medium, said certificate request comprising a key associated with a component sent over the unsecured public network by the second party to a third party;

generating and issuing, by the first party, a certificate corresponding to the key from the certificate request by the second party; and preventing fraudulent provisioning by preventing receipt of the certificate by a non-trusted requestor by generating and sending, using the processor, a secure provisioned component, the generating and sending the secure provisioned component comprising sending the issued certificate over the unsecured public network to the third party from the first party for provisioning the component with the issued certificate using the key, the secure component certificate provisioning being a one-directional transaction wherein the third party matches the issued certificate to the component for provisioning the component.

16. The computer program product of claim 15 wherein the component comprises an object selected from a group consisting of: a machine part, a hardware component, and a software component.

* * * * *